UNITED STATES PATENT OFFICE.

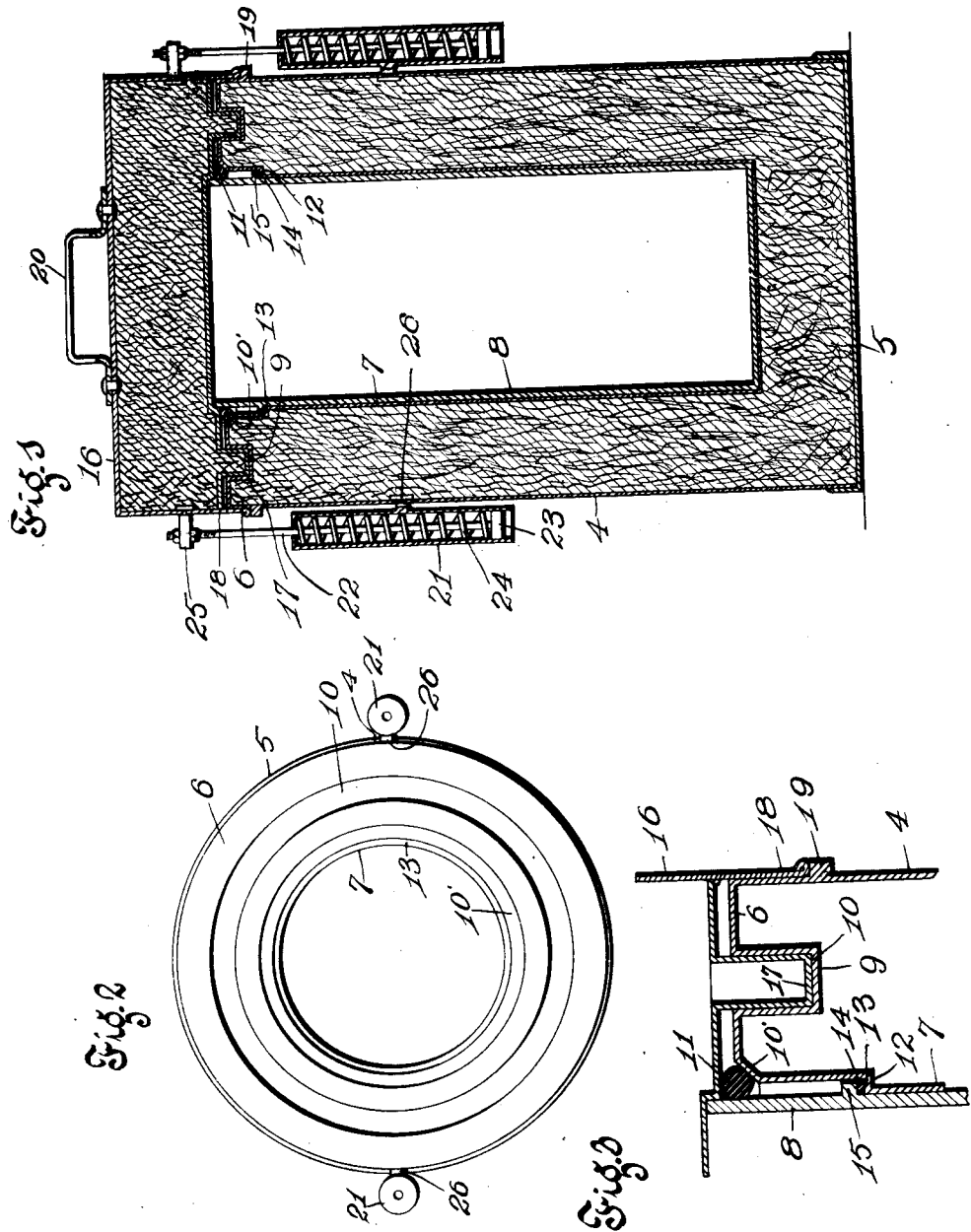

JOHN HAGUE, OF ST. LOUIS, MISSOURI.

ICELESS ICE-CREAM PACKER AND CABINET.

1,179,356. Specification of Letters Patent. Patented Apr. 11, 1916.

Application filed February 2, 1914. Serial No. 815,872.

*To all whom it may concern:*

Be it known that I, JOHN HAGUE, a citizen of the United States, and resident of St. Louis, State of Missouri, have invented certain new and useful Improvements in Iceless Ice-Cream Packers and Cabinets, of which the following is a specification.

This invention relates to improvements in an iceless ice cream packer and cabinet, and has for its object a central container in which the product is packed and a thoroughly insulated cabinet insulating all sides of the container which retains the freezing temperature within the container, and preserves the product in its frozen state for a greater length of time than were the container surrounded by packed ice.

A further object of my invention is to construct a cabinet properly provided with insulating material and so shaped as to receive a container in which is packed the product to be preserved in a frozen state; and which cabinet together with its contents can be handled far more readily and to better advantage than where ice is used, thus dispensing with the labor of keeping the container and its product properly provided with ice, and the wet and inconvenient manner of handling.

Figure 1, is a vertical central sectional view of my complete invention. Fig. 2, is a top plan view of the cabinet with its cover removed. Fig. 3, is an enlarged detail sectional view of a portion of the upper part of the cabinet container and cover.

In the construction of my invention I provide a cabinet constructed of a casing consisting of an outer wall 4, a bottom 5, a top 6, an inner wall 7; within the space occupied between these several members is placed a packing material of insulating nature such as packed ground cork, asbestos, mineral wool, or any other material which is found most practical and which will retain the temperature at its freezing point within the interior of the inner wall.

Within the inner wall is located a container or receptacle 8. In this receptacle is placed ice cream or a like frozen product, and in which condition the same is to be delivered to its proper destination. The top 6 of the cabinet is provided with a depressed portion 9, forming a groove 10, which acts as a seal. The top is also flared or bent at an angle, as indicated by the numeral 10', against which contacts a packing ring or strip of flexible packing material 11, which acts as an additional seal. The portion of the upper inner wall 7, is flared outwardly as indicated by the numeral 12, forming a recess and a shoulder 13, and on the shoulder within the recess is located a gasket 14, of pliable material on which rests a projection 15, in the form of a square ring around the entire container 8. This connection acts as an additional seal.

On the top of the cabinet is located a cover 16, which is also provided with packing material of insulating nature, and its bottom is shaped to correspond with the shape of the top 6, of the cabinet and said bottom is provided with an extension 17, which is designed to fit into the depression 9, of the top 6, which completes that portion of the seal. The side of the cover has a downwardly extending flange 18, which fits over the outer surface of the cabinet and its under crimped edge designed to contact with a flange 19 located on the outer surface of the cabinet. The said cover is provided with a handle 20, by which the same may be removed from its seal position. And on the sides of said cabinet are pivotally mounted small cylinders 21, in which are located rods 22, provided with a head 23, and on said rods between the heads and the top of the cylinders is placed a spring 24, whose tendency is to normally hold the rods downwardly in order to keep the top 16, in tight communication with the upper portion of the cabinet. The rods 22, have their upper ends connected to brackets 25, pivotally mounted on the sides of the cover. The cylinders 21, as will be observed are pivoted to the sides of the container by means of the pivots 26; by this structure the cover can be removed from its closed position by pulling upon the handle 20, which action will partially compress the spring 24, in the cylinders and permit the cover to be tilted to one side so that access can be had to the interior and the contents in the container 8.

The essential feature of my invention is to construct a cabinet in which ice-cream or like products are contained and to provide a cover which is so shaped as to provide a number of seals to prevent the escape of the inner temperature and also to prevent the warmth of the outside from contacting with the interior. Another feature is that by handling a product of this nature in a cabinet of this construction, the feature of conveying chopped ice in the vehicle in order to properly preserve the product is dispensed with. And the space occupied by the barrels containing ice and salt, can be utilized by packages of this nature and the freezing temperature within the cabinet is held at a much longer time than where ice is used. It also dispenses with the disagreeable handling as wherever ice and salt are used, the conveyance in which the material is transported becomes wet and soon rots; whereas a device of this nature overcomes all of these disagreeable features.

Having fully described my invention what I claim is:

1. An ice-cream packer and cabinet comprising a cabinet consisting of an inner and an outer wall, an inner and an outer bottom, a top connecting the inner and the outer walls; said top having an inclined portion, and a rectangular depression; a cover consisting of a top—a bottom and a side wall; an extension formed on the bottom to fit into the depression of the top of the cabinet of a receptacle adapted to be inserted in the cabinet, and a strip of packing located between the inclined surface of the top, bottom of the cover, and wall of the receptacle; the space between the walls of the cabinet and the cover provided with insulating material in order to retain the proper temperature of the article supported in the receptacle, a ring formed on the receptacle, a shoulder formed in the opening of the cabinet forming a rest for the ring and a gasket interposed between the shoulder and the ring, substantially as specified.

2. A device of the class described comprising a cabinet consisting of walls spaced apart and in which is located a filler of insulating material; a cover constructed of a top, a bottom and side wall which is also filled with insulating material; the top of the cabinet provided with a rect-angular depression portion, an inclined portion and a shoulder; the bottom of the cover having a rect-angular extension arranged to snugly fit in the rect-angular depression of the top; a receptacle located inside of the cabinet, an annular ring located on the receptacle located a short distance below the top thereof and adapted to rest on the shoulder of the inner wall of the cabinet; a gasket located between the same; a packing strip located on the inclined portion of the top and between the wall of the receptacle and bottom of the cover; brackets located on the side of the cover; rods connected thereto; cylinders pivotally mounted on the wall of the cabinet; springs located in said cylinders which springs exert pressure on the rods for holding the cover in a tight connection against the top of the cabinet, substantially as specified.

In testimony whereof, I have signed my name to this specification, in presence of two subscribing witnesses.

JOHN HAGUE.

Witnesses:
 ALFRED A. EICKS,
 WALTER C. STEIN.